Feb. 15, 1966  R. J. SMITH  3,235,119
POST SUPPORTED LITTER BOX
Filed Dec. 10, 1963  2 Sheets-Sheet 1

Ronald J. Smith
INVENTOR.

BY *Clarence A. O'Brien*
*and Harvey B. Jacobson*
Attorneys

Feb. 15, 1966 R. J. SMITH 3,235,119
POST SUPPORTED LITTER BOX
Filed Dec. 10, 1963 2 Sheets-Sheet 2
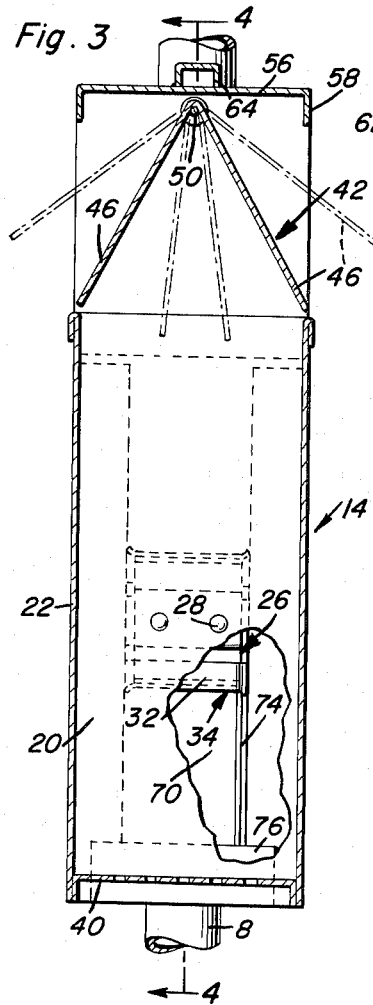
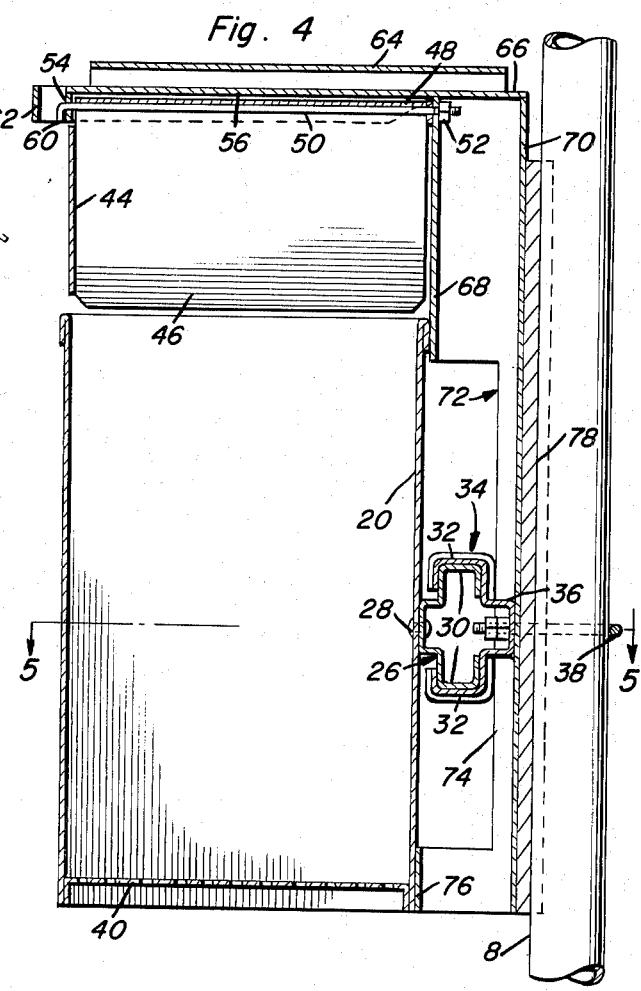
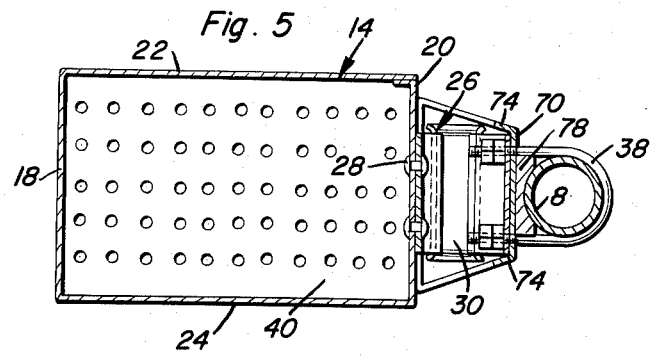
Ronald J. Smith
INVENTOR.

United States Patent Office 3,235,119
Patented Feb. 15, 1966

3,235,119
POST SUPPORTED LITTER BOX
Ronald J. Smith, Cuba, Mo., assignor of one-third to James E. Smith, Sr., and one-third to James E. Smith, Jr., of Cuba, Mo.
Filed Dec. 10, 1963, Ser. No. 329,573
3 Claims. (Cl. 220—18)

The present invention relates to a litter box for outdoor use and has to do, more particularly, with a fixed vertical post or an equivalent support and means carried by the litter box and post, respectively and which serves to mount the litter box detachably on the post, preferably at a desirably usable elevation.

The litter box, post and quick-separable connecting means therebetween is such that it can be aptly and satisfactorily used on speaker elevating and support posts in drive-in theaters, can be employed for curbside use on parking meter supporting posts, can be used on lampposts, and the like for use by pedestrians employing the usual city or equivalent sidewalk.

It follows that one object of the invention is to provide a properly constructed and performing litter box which lends itself to practical and efficient as well as safe use when appropriately mounted on a median portion of a speaker post in a drive-in theater. In keeping with this aspect of the concept the litter box is detachably bracketed on the speaker post, has an open top and is provided with a freely swingable closing hood which is so constructed and arranged relative to the post, applicable and removable speakers and the parking areas that the receptacle portion of the box is available to the occupants of automobiles parked to the left and right of the intervening post thereby obviating the necessity of employing more than a single litter box for each post.

As will be hereinafter more fully appreciated the improved litter box, specially constructed and performing cover means therefor, and attaching and retaining brackets offer a construction which lends itself to practical use on parking meter posts and street lighting posts for the convenience of pedestrians as they walk along city street sidewalks.

In carrying out the invention the construction and arrangement of parts is such that the novel litter box can be bodily handled in a horizontal plane at right angles to the perpendicular post by reason of the fact that the specially designed brackets which are provided can be readily connected and disconnected with respect to either the left or right side of the post by bodily moving the box in an easy-to-manage manner. It follows that with this construction no handle or handles are required for the box emptying and replacing steps.

Also and as will be hereinafter clarified the litter box is provided with a perforated bottom which provides for drainage and also ventilation and makes practical the services required of attendants in maintaining the box (which should be made of any suitable lightweight durable, non-corrodible non-flammable material) in an acceptable sanitary condition and, as a result of satisfactory drainage and ventilation facilities, free of objectionable odors.

The invention also features a litter box with novel closure means at the upper litter receiving end, a weather shield fixed in a plane above the cover means and overhanging the underlying surface portions of the cover means and an attaching and retaining bracket for cooperation with a companion anchor bracket, said anchor bracket being applicable to a post whether the post be that of a type above touched upon or which would be suitable for use on a golf course where, as is often the case, each tee is provided with ball washer on a post such as could also be used to support the herein disclosed litter box.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a view on an enlarged scale with portions broken away and taken on the vertical section line 3—3 of FIG. 1;

FIGURE 4 is a view at right angles to FIG. 3 taken on the vertical section line 4—4 of FIG. 3;

FIGURE 5 is a horizontal section taken on the section line 5—5 of FIG. 4; and

Figure 1:
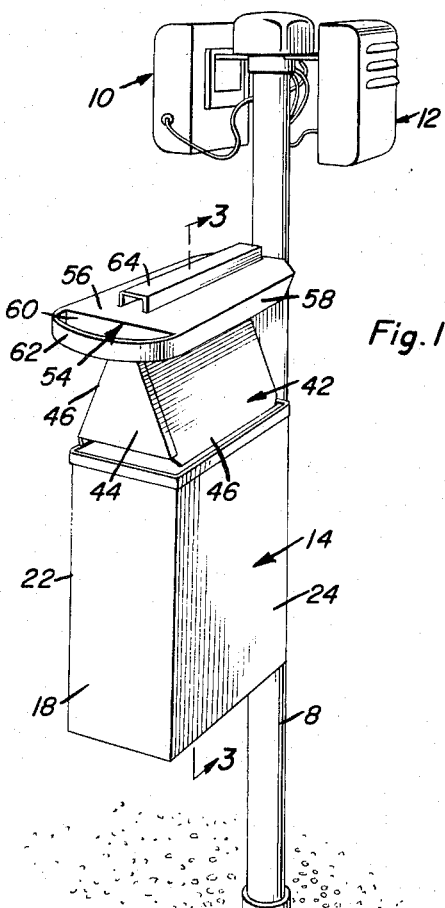
FIGURE 1 is a view in perspective illustrating a speaker supporting post such as is currently being used in drive-in theaters and wherein the post is provided, below the speakers, with means supporting the improved litter box.
Figure 2:
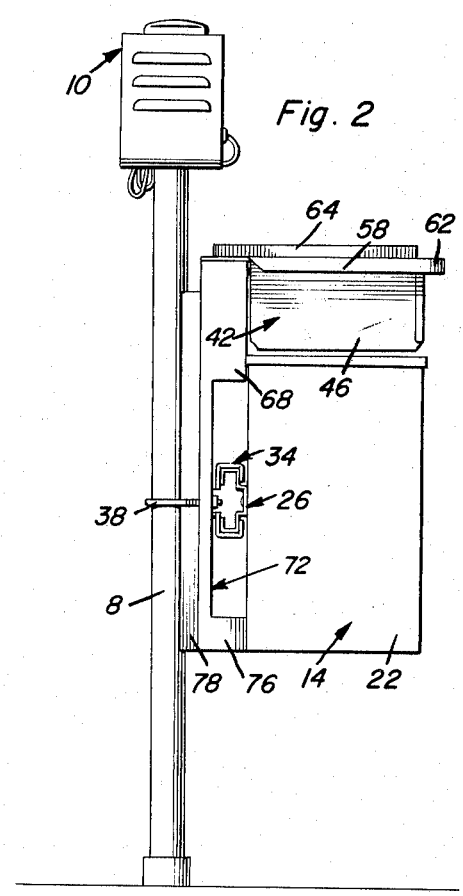
FIGURE 2 is a view in side elevation of the structure illustrated in FIG. 1.
Figure 6:
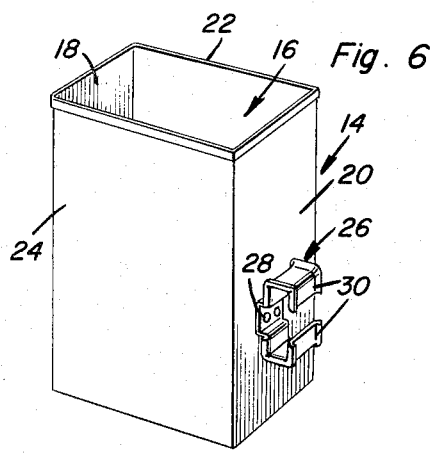
FIGURE 6 is a view in perspective, on a reduced scale, of the litter box and bracket with all other associated parts omitted.

It will be understood that the upright or other support member is anchored and provides a suitable stationary support, more particularly, a post. The fact that the description has already clarified the primary purposes which are served by the invention it will simplify this description to regard the post 8 as exemplary of any of the various posts which have so far been mentioned. Keeping in mind that it is the primary purpose of the invention to use a speaker support post it will be further evident that the post shown is the type which is commonly used in outdoor drive-in moving picture theaters. It follows that the upper portion of the post is provided with anchor brackets for the attachable and detachable left and right speaker units 10 and 12. The bodily attachable and detachable litter box proper is denoted by the numeral 14 and is made of strong, durable, lightweight sheet material which is preferably non-corrodible and wherein the size of the box is such that it can be readily handled by a duly appointed attendant. The box is here shown as open at the top as at 16 and characterized by a front wall 18, an opposed back or rear wall 20 and opposed side walls 22 and 24. Looking at FIG. 1, for example, the side wall 24 could be regarded as the righthand side wall and consequently the one on the other side 22 would be the lefthand side wall. This box is provided on a median part of the rear attachable supporting wall with an attaching and retaining bracket 26 having a fixed central web 28 and a pair of upper and lower spaced parallel substantially U-shaped clip portions 30. As illustrated in FIGS. 2 and 4, particularly FIG. 4, the male clip portions or U-clips 30 are fitted slidingly but in a friction-retained manner within the encompassing confines of a pair of female U-clips 32 which constitute components of the stationary anchoring bracket 34. This bracket has its central or web portion 36 secured on the post by way of a U-shaped clevis 38. The clevis embraces the post and the nut-equipped ends are connected to the median or web portion 36 of the bracket. It will be noted that the coacting interfitting clips of the respective brackets are not only in proper parallelism but are in a horizontal plane, a plane which is accordingly at right angles to the vertically anchored post 8. It follows that the box being of appropriate size for manual handling by a single person is bodily moved or applied and removed (for emptying and replacement) in a horizontal plane. It will be further evident in FIG. 4 that the bottom wall of the receptacle portion as denoted at 40 is perforated to provide not only for drainage but for efficient air circulation. Consequently, the attendant cannot only wash, rinse and dry the box, the bottom itself is self-draining and tends to minimize the likelihood of odors in and around the box.

The cover or closure means for the otherwise open top of the box comprises a simple and practical inverted V-shaped hood 42 having a closed triangular front wall 44, being open at the right or rearward end and embodying outwardly and downwardly sloping rain-shedding side walls 46 spreading to appropriately cover the open top of the box. The vertex portion 48 is suspended and rockably mounted for free swinging on a horizontal fixedly supported rod or shaft 50 having a nut-equipped rearward end 52 and a depending hooked front end 54. This arrangement of parts includes a horizontal flat plate 56 having depending marginal flanges 58 along the sides and a transverse flange 60 across the front which is apertured and supports the adjacent hooked end 54 of the rod 50. Also at the front there is a curvate outstanding auxiliary flange 62 which in the manner illustrated provides a desirable bumper guard. It will be further noted that the upper lengthwise median portion of this plate is reinforced by a channel-shaped rib 64. It will be further noted that the rearward end portion 66 in FIG. 4 closes in or over the upper end of a hollow box-like spacer and rest 68 formed at the upper end of the vertical plate portion 70 of adapter means 72. This adapter means is provided along the median portion with flanges 74 and at the bottom with a lower spacer and rest 76. This plate is in turn fixed on a main base plate 78 which is vertically elongated and has a channel therein which conformingly fits against the surface of the post contacted thereby as brought out in FIG. 5. These two upper and lower rests 68 and 76 function as stabilizing abutments for the coacting upper and lower end portions of the rear wall 20 of the box.

It will be evident from the construction shown and described that the litter box constitutes a practical post-attachment and is such in functional design and construction that it does not interfere with opening and closing of automobile doors of the automobiles located to the right and left of the post and box, considering too the fact that the automobiles must, of course, be properly parked. The anchoring clip on the post may be regarded (for purposes of claims and other aspects of the description) as a first bracket having built-in clip means and the bracket 26 on the box as a second bracket also with clip means and the respective male and female functions thereof and the horizontal positioning assuring accomplishment of the ready application and removal of the box in a horizontal plane relative to the verticality of the support post.

It is submitted that a careful consideration of the specification in conjunction with the claims will enable the reader to obtain a clear and comprehensive understanding of the invention. Therefore, a more extended description is believed to be unnecessary.

Minor structural changes and modifications involving shape, size, materials and rearrangement of component parts may be resorted to in actual practice without departing from the spirit of the invention or the scope of the invention as claimed.

What is claimed as new is as follows:

1. In combination, a fixed vertical post, a first bracket operatively mounted on said post, a manually attachable and detachable open top litter box having a vertical attaching and supporting wall, a second bracket fixed on said vertical wall and detachably connected to said first bracket, cover means for said open top comprising an inverted V-shaped hood, means pivotally suspending the vertex portion of said hood, said means functioning to suspend the hood above and in alignment with said open top, said hood being freely swingable, said box being vertically elongated and readily and bodily attachable and detachable by applying and removing it in a plane lateral to the vertical axis of said post in a manner to unobstructedly align and readily connect and disconnect said brackets and, in combination, a plate fixedly supported at an inward end on and extending laterally from said post and occupying a horizontal plane above and completely overlying said hood, box and brackets and providing a tamper-resisting and weather shield.

2. The structure according to claim 1, and wherein the forward end of said plate is provided with an outstanding bumper guard projecting beyond the front portions of said hood and box, respectively.

3. The structure defined in claim 2, and wherein said brackets embody U-shaped interconnectible male and female clip portions which are adapted to enable one to attach and detach the box by bodily moving the same in a horizontal plane relative to the verticality of said post.

References Cited by the Examiner

UNITED STATES PATENTS

| | | | |
|---|---|---|---|
| 1,238,993 | 9/1917 | Edwards | 220—32 |
| 1,329,605 | 2/1920 | Jeffers | 248—345.1 |
| 1,494,181 | 5/1924 | Morris | 232—17 |
| 2,303,598 | 12/1942 | Alley | 232—43.1 |
| 2,532,692 | 12/1950 | Borberg. | |
| 2,893,676 | 7/1959 | Connors et al. | 248—225 |
| 2,932,120 | 4/1960 | Nacinovich | 248—345.1 |
| 3,144,984 | 8/1964 | Ross | 232—17 |

FOREIGN PATENTS

| | | |
|---|---|---|
| 478,091 | 10/1951 | Canada. |
| 330,817 | 6/1930 | Great Britain. |

LOUIS G. MANCENE, *Primary Examiner.*

GEORGE E. LOWRANCE, *Examiner.*